(12) United States Patent
Sakhnini et al.

(10) Patent No.: US 11,630,183 B2
(45) Date of Patent: Apr. 18, 2023

(54) METHOD AND DEVICES FOR RADAR INTERFERENCE REDUCTION

(71) Applicant: Axis AB, Lund (SE)

(72) Inventors: Adham Sakhnini, Lund (SE); Andreas Glatz, Lund (SE); Axel Landgren, Lund (SE); Mattias Simonsson, Lund (SE); Anders Skoog, Lund (SE); Anders Mannesson, Lund (SE); Sebastian Heunisch, Lund (SE); Stefan Adalbjörnsson, Lund (SE); Karl Nordin, Lund (SE)

(73) Assignee: Axis AB, Lund (SE)

( * ) Notice: Subject to any disclaimer, the term of this patent is extended or adjusted under 35 U.S.C. 154(b) by 158 days.

(21) Appl. No.: 17/216,749

(22) Filed: Mar. 30, 2021

(65) Prior Publication Data

US 2021/0349179 A1   Nov. 11, 2021

(30) Foreign Application Priority Data

May 11, 2020   (EP) ..................................... 20173888

(51) Int. Cl.
  *G01S 13/87*   (2006.01)
  *G01S 7/02*   (2006.01)
  *G01S 7/35*   (2006.01)

(52) U.S. Cl.
  CPC ............ *G01S 7/0235* (2021.05); *G01S 7/354* (2013.01); *G01S 13/87* (2013.01)

(58) Field of Classification Search
  CPC ........ G01S 13/34; G01S 13/584; G01S 13/87; G01S 13/931; G01S 7/023; G01S 7/0235; G01S 7/354
  See application file for complete search history.

(56) References Cited

U.S. PATENT DOCUMENTS 7,369,484 B1   5/2008  Prismantas et al.
9,543,974 B1*  1/2017  Yang .................. H03M 1/0863
(Continued)

FOREIGN PATENT DOCUMENTS

EP       3637127 A1     4/2020
WO    2019/106656 A1    6/2019
WO    2019/215732 A1   11/2019

OTHER PUBLICATIONS

Extended European Search Report dated Oct. 26, 2020 for European Patent Application No. 20173888.7.
(Continued)

*Primary Examiner* — Timothy A Brainard
(74) *Attorney, Agent, or Firm* — Volpe Koenig (57) ABSTRACT

A method for interference reduction between radar units. The method is performed by a radar unit and comprises: receiving one or more radar frames, wherein the one or more radar frames correspond to one or more respective time intervals during which the radar unit was activated to transmit and receive signals to produce data samples of the one or more radar frames; and determining whether the one or more radar frames have a higher presence of data samples that are subject to interference from other radar units in a first half of their corresponding time intervals than in a second, later, half of their corresponding time intervals. In case the presence is higher in the first half of their corresponding time intervals, a scheduled time interval of an upcoming radar frame to be produced by the radar unit is postponed, and otherwise it is advanced.

15 Claims, 4 Drawing Sheets

(56) References Cited

U.S. PATENT DOCUMENTS

| | | |
|---|---|---|
| 2007/0186678 A1* | 8/2007 | Griessbaum .......... G01F 23/266 |
| | | 702/50 |
| 2011/0291875 A1 | 12/2011 | Szajnowski |
| 2018/0095162 A1 | 4/2018 | Fetterman et al. |
| 2019/0339358 A1 | 11/2019 | Rimini et al. |

OTHER PUBLICATIONS

Beise, H. et al. "Virtual interference study for FMCW and PMCW radar", 2018 11th German Microwave Conference (GeMiC), pp. 351-354 (2018).

Aydogdu, C. et al., "RadChat: Spectrum Sharing for Automotive Radar Interference Mitigation", IEEE Transactions on Intelligent Transportation Systems, pp. 1-14 (2019).

* cited by examiner

METHOD AND DEVICES FOR RADAR INTERFERENCE REDUCTION

TECHNICAL FIELD

The present invention relates to the field of radar. In particular, it relates to reducing interference between radars.

BACKGROUND

Radar is used for security surveillance purposes, either on its own or in combination with other sensors. For example, radar may be used for perimeter surveillance where intrusions of people of vehicles in a monitored area are detected. One type of radar that is used for security surveillance purposes is frequency-modulated continuous-wave (FMCW) radars. A FMCW radar transmits frequency modulated sinusoidal signals, sometimes referred to as chirps, and simultaneously receives echoes of the transmitted signals as reflected by objects in front of the radar. The transmitted and received signals are mixed to produce data samples which then are subject to frequency analysis to identify distances and velocities of objects in front of the radar. An FMCW radar is an example of a radar that may be activated to transmit and receive signals during time intervals. In between those time intervals the radar may be inactive.

In some situations, a plurality of radars may be used to monitor an area. If several radars are active to transmit and receive signals at the same time, they will interfere with each other. In more detail, signals transmitted by a first radar may be received by a second radar in addition to the echoes reflected off objects in front of the second radar. The signals transmitted by the first radar will typically be stronger than the echoes and will therefore have a large impact on the data samples produced by the second radar. Specifically, when the frequency of the transmitted signals of the first radar is close to the frequency of the transmitted signal of the second radar, interference occurs. As a result, the data samples produced by the second radar at such moments will be subject to interference.

The interfered data samples will have a negative impact on the subsequent frequency analysis of the data samples and thereby reduce the ability of the radar to correctly identify distances and velocities of objects in front of the radar. It is therefore desirable to reduce the interference between the radar units as much as possible.

One approach of reducing interference is to schedule the different radars to be active during different time slots. Such an approach relies on having highly synchronized clocks in the different radars, since even the slightest drift between the clocks will eventually cause the scheduled time slots of the radars to overlap. There is thus room for improvements.

SUMMARY

In view of the above, mitigating the above problems and provide interference reduction between radar units even in the presence of a clock drift between the radar units would be beneficial.

According to a first aspect, a method for interference reduction performed by a radar unit, comprises:

receiving one or more radar frames, wherein the one or more radar frames correspond to one or more respective time intervals during which the radar unit was activated to transmit and receive signals to produce data samples of the one or more radar frames, determining whether the one or more radar frames have a higher presence of data samples that are subject to interference from other radar units in a first half of their corresponding time intervals than in a second, later, half of their corresponding time intervals, in case it is determined that the presence is higher in the first half of their corresponding time intervals, postponing a scheduled time interval of an upcoming radar frame to be produced by the radar unit, and in case it is determined that the presence is higher in the second half of their corresponding time intervals, advancing a scheduled time interval of an upcoming radar frame to be produced by the radar unit.

The radar unit is hence active to produce data samples during certain time intervals. During these time intervals, other radar units may also be active, thereby giving rise to interference. The method stems from the realization that an indication of when the other radar units are active and causes interference can indirectly be derived by analyzing when interfered data samples are present during the time intervals when the radar unit is active. Specifically, the radar unit may determine whether there is a higher presence of interfered data samples in a first half than in a second, later, half of the time intervals. Having a higher presence of interfered data samples in the first half of the time intervals indicates that the activity of and interference from other radar units was higher in the first half of the time intervals than in the second half of the time intervals. The radar unit can make use of such an indication to adjust the timing of upcoming time intervals when the radar unit is active so as to reduce the overlap with time intervals when the other radar units are active.

In more detail, the interfered data samples may provide guidance in what direction an upcoming time interval should be adjusted. Specifically, if it is found that the presence of interfered samples is higher in the first half of the time intervals, an upcoming time interval may be postponed in relation to when it was originally scheduled. Conversely, if it is found that the presence of interfered samples is higher in the second half of the time intervals, an upcoming time interval may be advanced in relation to when it was originally scheduled. In that way, the upcoming time interval is moved away from interfering periods of activity of the other radar units. Accordingly, this method serves to reduce the overlap between active time intervals of the radar units, thereby reducing interference.

It is noted that this method can be used to avoid the situation where scheduled time intervals of several radar units are caused to overlap more than necessary due to a drift between the clocks in the radar units. In particular, when the method is applied it will automatically adjust the scheduled time interval of an upcoming radar frame to reduce the overlap with the scheduled time intervals of the other radar units. The method can hence advantageously be used to compensate for the clock drift between the radar units.

As used herein, interference reduction refers to reducing interference between the radar unit and other radar units. The interference appears as the radar unit receives radar signals transmitted by the other radar units. The radar unit and the other radar units may be included in the same system of radars.

By a radar frame is generally meant a data structure which includes the data samples produced by the radar unit during a time interval when it is active to transmit and receive signals. In particular, the radar unit transmits and receives a plurality of periodical signals during the time interval. The data samples in the radar frame are produced by mixing these transmitted and received plurality of periodical signals. The radar frame may be divided into a first half and a second half. The first half of the radar frame corresponds to those data samples in the radar frame that were produced by the radar unit in a first half of the time interval. The second half of the radar frame corresponds to those data samples in the radar frame that were produced by the radar unit in a second, later, half of the time interval.

As used herein, an upcoming radar frame refers to a radar frame that has not yet been produced by the radar unit. For example, the upcoming radar frame may be the next frame to be produced by the radar unit following the one or more received radar frames. However, it could also be a radar frame to be produced even further ahead in time.

By a scheduled time interval of an upcoming radar frame is meant a time interval when the radar unit is scheduled to be active to produce the upcoming radar frame. For example, the radar unit may be scheduled to be active during time intervals that re-occur with a predefined time period.

By postponing a scheduled time interval is meant that the start time of the scheduled time interval is delayed. Similarly, by advancing a scheduled time interval is meant that the scheduled time interval is caused to start at an earlier time point than scheduled. However, the duration of the scheduled time interval is typically maintained in each of these cases.

According to a first group of embodiments, the step of determining may include calculating a first quantity and a second quantity being indicative of the presence of data samples that are subject to interference from other radar units in the first half and in the second half, respectively, of the time intervals of the one or more radar frames, and determining that the presence of data samples that are subject to interference from other radar units is higher in the first half of the time intervals than in the second half of the time intervals if the first quantity is larger than the second quantity. The calculation of the first and the second quantity thus makes it possible to quantify the presence of interfered data samples in the first and the second half of the time intervals.

The interfered data samples may not only provide guidance in what direction to adjust an upcoming time interval, but may also provide guidance on how much to postpone or advance the upcoming time interval. Specifically, the scheduled time interval of the upcoming radar frame may be postponed or advanced by an amount which is proportional to a difference between the first quantity and the second quantity. Thus, the more overweight there is of interfered data samples in the first half, the larger the postponement. Conversely, the more overweight there is of interfered data samples in the second half, the larger the advancement. In this way, the radar unit can adapt the amount of the adjustment depending on how concentrated the interferences are to one of the halves of the time intervals of the received radar frames. In the end, this will lead to a faster adaptation of upcoming time intervals to the interferences observed in the received radar frames.

The first quantity and the second quantity may be calculated as a number of data samples that are subject to interference from other radar units in the first half and the second half, respectively, of the time intervals of the one or more radar frames. The radar unit may hence accumulate information indicative of the number of interfered data samples from the first half and the second half, respectively, of each of the received radar frames. In that way, the radar unit may efficiently count how many data samples are subject to interference in each of the halves of the received radar frames.

According to another approach, the first quantity and the second quantity are instead calculated as a sum of energies of data samples in the first half and in the second half, respectively, of the time intervals of the one or more radar frames. Notably, this approach sums the energies of all data samples in the one or more radar frames, not only of the interfered data samples. There is hence no need for first identifying the interfered data samples in the one or more radar frames. This approach stems from the realization that if the signals received by the radar unit only originate from echoes off objects in front of the radar unit the energies of the data samples in the radar frames would be essentially constant, while this is not the case if the signal received by the radar unit originates from a transmitter of another radar unit. In the latter case, the energies of the data samples will instead be higher in portions of the time intervals where interference occurs. Accordingly, the contribution to the energy from echoes will be the same in both halves of the time intervals and therefore cancel each other when the first and the second quantity are compared. This is in contrast to the contribution to the energy from interfering transmitters which will be higher in the first half than the second half of the time intervals if there is more interference in the first half than the second half, and vice versa.

The data samples in the one or more radar frames may be given different weights according to their temporal positions within the time intervals of the one or more radar frames when calculating the first and the second quantity, wherein the weights decrease with increasing distance of a temporal position of a data sample to a center point of a time interval. By weighting the data samples in this way, data samples that are located closer to the center of the time interval are given higher weight than data samples being located further away from the center. As a result, the method will penalize having interfered data samples at the center of the frame and the adjustment of the time interval of the upcoming radar frame will hence be made in a direction that favours reduction of interference in the center of the upcoming radar frame over reduction of interference at the boundaries of the upcoming radar frame. A reason for giving higher penalty to interfered data samples in the center of the time interval is that interfered data samples that are closer to the center of the radar frames typically have a larger impact on the frequency analysis performed by the radar unit. This is due to the fact that the frequency analysis usually applies windowing to the radar frames that downweighs data samples at the boundaries of the radar frames. Also, if there are more radar units in the system than there are available time slots, the time slots when the radar units are active will necessarily overlap. By applying the weighting approach, the method will favour having those overlaps at the boundaries of the time intervals.

In a second group of embodiments, the step of determining may include calculating a distribution that reflects how the presence of data samples that are subject to interference from other radar units are distributed over the time intervals of the one or more radar frames, and determining that the presence of data samples that are subject to interference from other radar units is higher in the first half of the time intervals than in the second half of the time intervals if a center of gravity of the distribution is located in the first half of the time intervals of the one or more radar frames. In this way, the radar unit hence estimates where, along the time intervals, the interfered data samples appear on average.

Particularly, the radar unit finds out whether they, on average, appear in the first half or in the second half of the time intervals.

The average position of the interfered data samples along the time intervals may not only provide guidance in what direction to adjust an upcoming time interval, but may also provide guidance on how much to postpone or advance the upcoming time interval. In particular, the scheduled time interval of the upcoming radar frame may be postponed or advanced by an amount which depends on a location of said center of gravity of the distribution within the time intervals of the one or more radar frames, wherein said amount increases with decreasing distance between the location of the center of gravity and a center point of the time intervals of the one or more radar frames. Thus, the closer the center of gravity is to the center of the time intervals, the larger the postponement or advancement. A larger postponement or advancement of the upcoming radar frame may be needed in such cases to move the upcoming radar frame away from overlapping with periods of activity of the other radar units. In the end, this leads to a faster adaptation of upcoming time intervals to the interferences observed in the received radar frames.

The distribution may be calculated as a distribution of a number of data samples that are subject to interference from other radar units over the time intervals of the one or more radar frames. Alternatively, the distribution is calculated as a distribution of energies of the data samples over the time intervals of the one or more radar frames. In the latter case, and as explained above, there is no need to first identify the interfered data samples.

In cases where the one or more radar frames include a plurality of radar frames, it is understood that information regarding the presence of interfered data samples as described above may be accumulated from each of the received radar frames and be used to arrive at a decision whether the presence of interfered data samples is higher in a first than in a second half of the time intervals of the radar frames. In particular, the radar unit may determine whether the plurality of radar frames on average have a higher presence of data samples that are subject to interference from other radar units in the first half of their corresponding time intervals than in the second half of their corresponding time intervals.

The one or more radar frames may each include data samples of a plurality of beat signals, and the method may further comprise filtering the plurality of beat signals to enhance or reduce specific frequencies prior to determining whether the one or more radar frames have a higher presence of data samples that are subject to interference from other radar units in a first half than in a second half of their corresponding time intervals. Desired signals that originate from echoes off objects in front of the radar unit typically have a band-limited frequency spectrum. This is in contrast to the interferences that typically have a wide-band frequency spectrum. By applying a filter that reduces frequencies in the frequency band of the desired signals, or, equivalently, a filter that enhances frequencies outside of that band, the interfered data samples may be amplified in relation to non-interfered data samples. In that way, it becomes easier to identify the interfered data samples in the radar frames. By way of example, a high pass filter may be applied to the plurality of beat signals to enhance the interfered data samples.

The scheduled time interval of the upcoming radar frame may be postponed or advanced by at most a predetermined maximum value. In that way the method may be prevented from over-reacting to observed interferences.

The method may be repeated at a predetermined time interval. In that way, the radar unit may adapt over time to adjust for overlapping periods of activity with respect to the other radar units. For example, it may adapt to overlaps that arise due to a clock drift between the radar units.

The radar unit may be included in a system of a plurality of radar units, and the method may be performed independently by at least two radar units among the plurality of radar units. In that way, the radar units may independently adapt their periods of activity to each other to minimize the radar interference in the system as a whole.

According to a second aspect, a controller for interference reduction in a radar unit, comprises:

circuitry configured to receive one or more radar frames, wherein the one or more radar frames correspond to one or more respective time intervals during which the radar unit was activated to transmit and receive signals to produce data samples of the one or more radar frames, circuitry configured to determine whether the one or more radar frames have a higher presence of data samples that are subject to interference from other radar units in a first half of their corresponding time intervals than in a second, later, half of their corresponding time intervals, circuitry configured to postpone a scheduled time interval of an upcoming radar frame to be produced by the radar unit in case it is determined that the presence is higher in the first half of their corresponding time intervals, and circuitry configured to advance a scheduled time interval of an upcoming radar frame to be produced by the radar unit in case it is determined that the presence is higher in the second half of their corresponding time intervals, advancing a scheduled time interval of an upcoming radar frame to be produced by the radar unit.

According to a third aspect, a radar unit comprises a controller according to the second aspect.

According to a fourth aspect, a non-transitory computer-readable medium having stored thereon computer code instructions is adapted to carry out the method of the first aspect when executed by a device having processing capability.

The second, third, and fourth aspects may generally have the same features and advantages as the first aspect. It is further noted that all possible combinations of features are envisioned unless explicitly stated otherwise.

BRIEF DESCRIPTION OF THE DRAWINGS

The above, as well as additional objects, features and advantages, will be better understood through the following illustrative and non-limiting detailed description of embodiments, with reference to the appended drawings, where the same reference numerals will be used for similar elements, wherein.

DETAILED DESCRIPTION OF EMBODIMENTS

The present teachings will be described more fully hereinafter with reference to the accompanying drawings, in which embodiments are shown.

Figure 1:
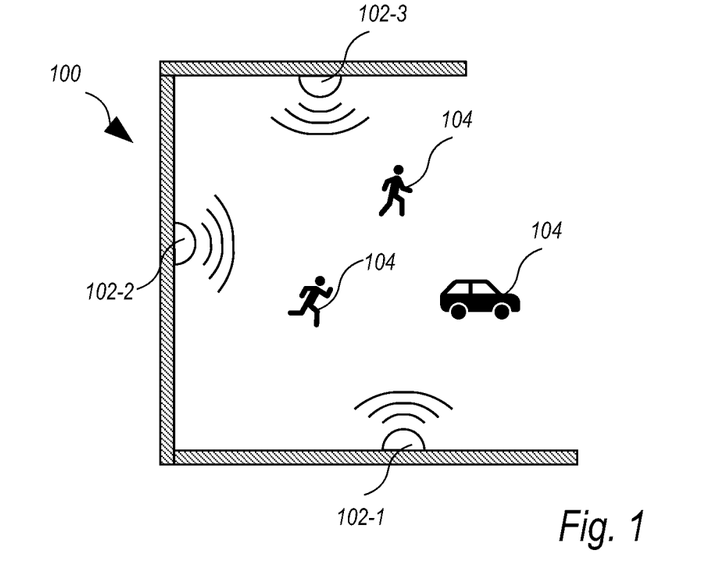
FIG. 1 schematically illustrates a radar system comprising a plurality of radar units according to embodiments.

FIG. 1 illustrates a radar system 100 being installed to monitor a scene which may include objects 104. The radar system comprises a plurality of radar units 102, here illustrated by a first radar unit 102-1, a second radar unit 102-2, and a third radar unit 102-3. In the illustrated example the radar units are stationary and do hence not move while in use. However, in other embodiments, the radar units may be mounted to a moving object. For example, the three radar units 102-1, 102-1 and 103-3 could be arranged on a car.

The plurality of radar units 102 are of a type that actively transmits and receives signals during time intervals and remain inactive between those time intervals. By way of example, the plurality of radar units 102 may be continuous wave radars. Further, the radar units 102 are preferably of the same type. For example, the radar units 102 may all be FMCW radars. However, this is not necessary the case. For example, one radar unit may be a FMCW radar and another radar unit may be a Phase Modulated Continuous Wave (PMCW) radar.

Each radar unit 102 is typically operated independently of the other radar units and is hence unaware of when the other radar units 102 in the system 100 are active or inactive. The active time intervals of a radar unit 102-1, 102-2, 102-3 may as a general rule re-occur with a certain time period, corresponding to a frame rate of the radar unit. This time period is preferably the same for all the radar units 102-1, 102-2, 102-3 of the system 100. In other words, the radar units 102-1, 102-2, 102-3 typically operate at the same frame rate. The duration of an active time interval is preferably the same for the radar units 102, although embodiments where different radar units have different duration of the active time intervals are also possible.

Figure 2:
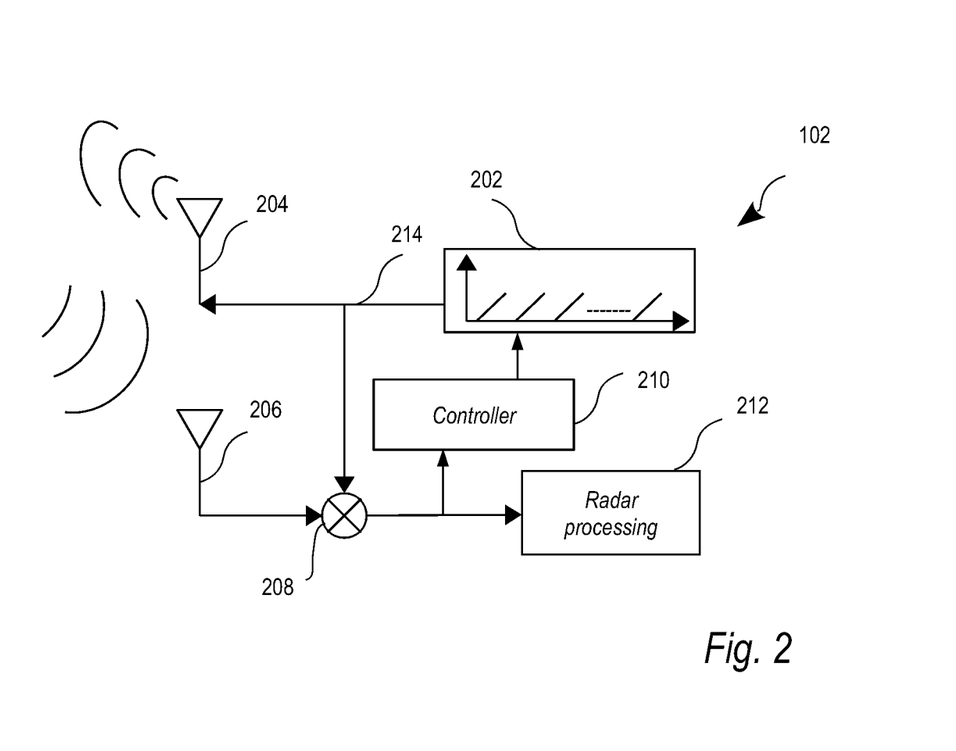
FIG. 2 schematically illustrates a radar unit according to embodiments.

A radar unit 102, which for purposes of exemplification is assumed to be radar unit 102-1, is illustrated in further detail in FIG. 2. The radar unit 102 comprises a synthesizer 202, a transmit antenna 204, a receive antenna 206, a mixer 208, and a controller 210. The radar unit 102 may further include a radar processing unit 212.

The transmit antenna 204 is configured to transmit a sequence of signals 214. The sequence of signals 214 includes a plurality of subsequent signals. The plurality of signals are transmitted with a predefined periodicity. The sequence of signals 214 may be generated by the synthesizer 202. Each signal in the sequence of signals 214 may be a frequency modulated sinusoidal signal such as a sinusoid whose frequency increases linearly with time—sometimes also referred to as a chirp. The signals in the transmitted sequence of signals 214 are reflected off objects 104 in the scene such that a reflected sequence of signals comes back towards the radar unit 102. The reflected sequence of signals is received by the receive antenna 206. The receive antenna 206 hence receives a reflected sequence of signals in response to the sequence of signals 214 transmitted by the transmit antenna 204. The reflected sequence of signals may sometimes in this disclosure be referred to as echoes and it should be understood that the terms may be used interchangeably.

In addition to the reflected sequence of signals, the receive antenna 206 may receive signals which are transmitted from transmitters which are not part of the radar unit 102-1, such as transmitters of the other radar units radar 102-2, 102-3 in the same radar system 100. Those signals will be superposed with the reflected sequence of signals at the receive antenna 206. The signal received by the receive antenna 206 may hence have a component stemming from the reflected sequence of signals, which originates from the radar unit itself and are reflected off objects 104 in the scene, and another component stemming from sequences of signals transmitted by interfering radar units 102-2, 102-3 in the system 100.

Figure 3:
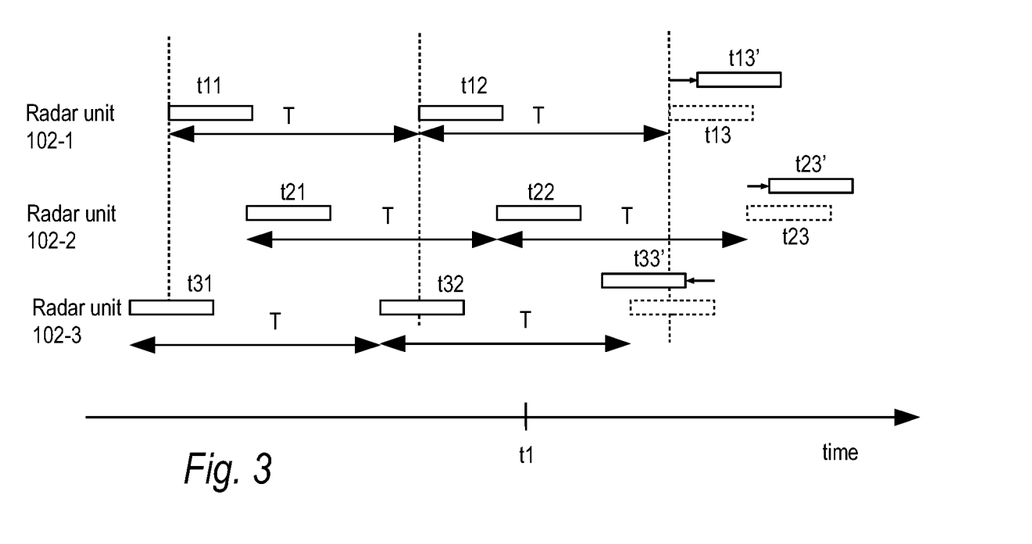
FIG. 3 schematically illustrates time intervals when a plurality of radar units are active to transmit and receive signals.

The radar unit 102 may be activated to transmit and receive signals during time intervals. In particular, the controller 210 may be configured to activate the radar unit during those time intervals, for example by activating the synthesizer 202 to produce a sequence of signals 214 which is then transmitted by the transmit antenna 204. As illustrated in FIG. 3, the synthesizer 202 may cause the transmit antenna 204 of radar unit 102-1 to send out a sequence of signals 214 during a first time interval $t11$. The synthesizer 202 may then be silent for a while before causing the transmit antenna 204 to send out a further sequence of signals 214 during a second time interval $t12$. Similarly, the radar units 102-2 and 102-3 also actively transmit and receive signals during distinctive time intervals. The time intervals may be scheduled to start at certain time points following a predetermined rule. By way of example, the time intervals when the radar unit 102-1 actively transmits and receives signals may, as a general rule, occur with a predetermined frequency corresponding to a frame rate of the radar unit 102. In the example of FIG. 3, the time intervals are scheduled to occur with a time period T. The time between a start time of a time interval $t11$ and a scheduled start time of a next time interval $t12$ is hence equal to T in that example. However, as will be described in more detail below, the controller 210 may adjust the start time of an upcoming time interval, such as time interval $t13$, when the radar unit 102-1 is scheduled to be active so as to reduce interferences from the other radar units 102-2, 102-3.

Returning to FIG. 2, the signals that are transmitted by the transmit antenna 204 and the signals that are received by the receive antenna 206 during a time interval when the radar unit 102 is active are combined to produce a radar frame corresponding to the time interval. In more detail, the mixer 208 mixes the transmitted and the received signals to produce the radar frame. The radar frame includes data samples of the output signals of the mixer generated from signals that were transmitted and received during the time interval. The data samples are typically complex valued and are sometimes referred to as baseband samples. In principle, the mixer 208 is configured to mix its input signals by calculating a product of the input signals, i.e., a product of the signals transmitted and received by the radar unit 102. The output signals generated by the mixer 208 are sometimes referred to as a sequence of beat signals or intermediate frequency signals. The radar frame may hence be said to include data samples of a sequence of beat signals. The sequence of beat signals corresponds to the sequence of signals 214 transmitted by the radar unit during the time interval. In particular, each beat signal is a mix of a corresponding signal in the transmitted sequence of signals 214 and a signal received by the receive antenna of the radar unit in response thereto. As mentioned above, the signal received by the radar unit corresponds to the reflection of the transmitted signal in situations when there are no interfering radar units. However, when there are interfering transmitters the signal received by the radar unit additionally includes signals transmitted by interfering radar units.

Figure 4:
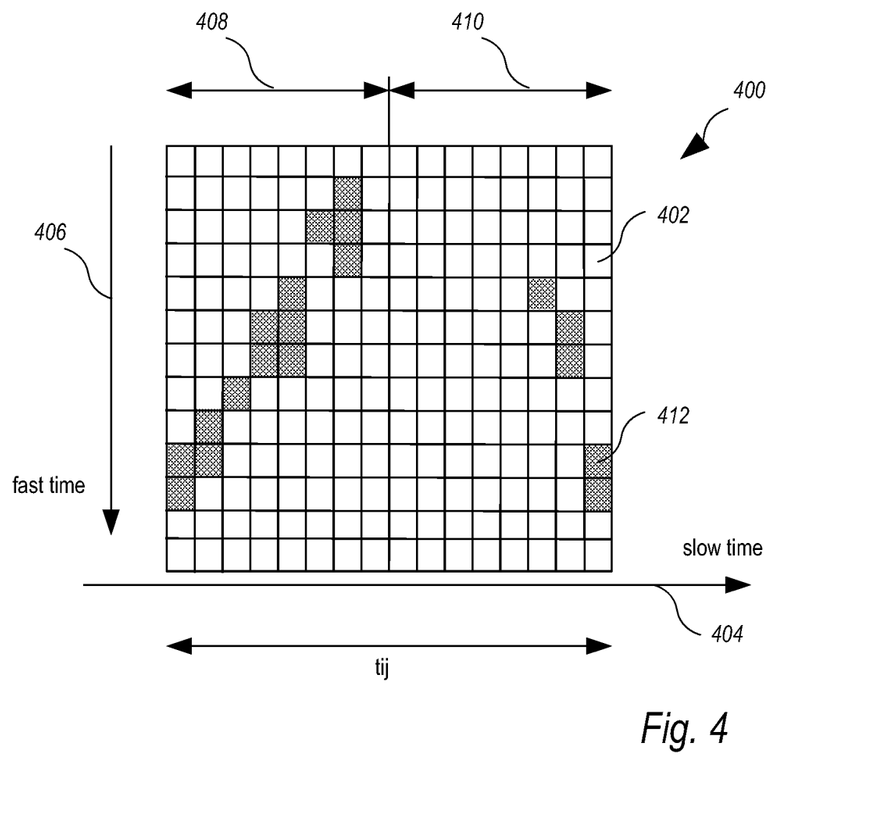
FIG. 4 schematically illustrates a radar frame of data samples as produced by a radar unit during a time interval.

FIG. 4 illustrates a radar frame 400 of data samples 402 corresponding to a time interval tij during which the radar unit 102 was active. The data samples 402 in the radar frame 400 are arranged in an array along two time axes 406 and 404. The first time axis 406 is sometimes referred to as fast time, while the second time axis 404 is sometimes referred to as slow time. On the one hand, each sub-vector of the radar frame 400 along the fast time axis 406 corresponds to data samples of a single beat signal. The length of the radar frame along the fast time axis hence corresponds to the duration of a beat signal, which in turn corresponds to the duration of one of the signals (i.e., a chirp) transmitted by the radar unit 102 during the time interval tij. On the other hand, each sub-vector of the radar frame 400 along the slow time axis 404 includes one data sample from each beat signal in the sequence of beat signals produced during the time interval tij, where the data samples have the same temporal position along the fast time axis 404. Thus the length of the radar frame 400 along the slow time axis 404 corresponds to the duration of the time interval tij.

The radar frame 400 may hence be said to include data samples of a plurality of subsequent beat signals produced by the radar unit during the time interval tij. Corresponding data samples of the subsequent beat signals are organized after each other along the slow time axis 404, while data samples of a single beat signal are organized after each other along the fast time axis 406.

The radar frame 400 has a first half 408 along the slow time axis 404, and a second, later, half 410 along the slow time axis 404. The first half 408 hence corresponds to data samples being produced by the radar unit 102 during a first half of the time interval tij, while the second half 410 corresponds to data samples being produced by the radar unit 102 during a second, later, half of the time interval tij. Differently stated, the first half 408 of the radar frame 400 corresponds to a first half of the sequence of beat signals produced by the radar unit during time interval tij, and the second half 410 of the radar frame 400 corresponds to a second, later, half of the sequence of beat signals produced by the radar unit 102 during the time period tij.

Although not shown, it is understood that the radar frame 400 further may extend along a third dimension. In that case, the data samples in different layers of the radar frame along the third dimension may correspond to different receive antennas of the radar unit 102.

Returning again to FIG. 2, the radar processing unit 212 may process the radar frames which are output by the mixer 208. The radar processing unit 212 may perform any known type of radar processing, such as frequency analysis, to calculate the distance, velocity, and angle of objects in the scene. This includes range and Doppler FFT (Fast Fourier Transform, FFT), and angle digital beamforming. Prior to performing the frequency analysis of a radar frame, the radar processing unit 212 may apply windowing to the radar frame along one or both of the fast time and the slow time axis. Applying a window along a time axis means that data samples along the axis are multiplied by a window function. The window function typically has its highest value at the middle of the frame along the time axis and decreases towards the end points of the frame along the time axis. The processing by the radar processing unit 212 may give rise to artefacts in the resulting distance, velocity, and angle signals in case there are interfered data samples in the radar frames. It is therefore desirable to reduce the amount of interference as far as possible.

In FIG. 3, a situation is shown where there is an overlap between the time intervals when the different radar units 102-1, 102-2, 102-3 are activated. For example, time interval t22 of radar unit 102-2 and time interval t32 of radar unit 102-3 both overlap with time interval t12 of radar unit 102-1. This gives rise to interference between the radar units, especially at time points when the radar units simultaneously transmit at a similar frequency. As a result, some of the data samples in the radar frames will be subject to interference as illustrated by the dotted samples 412 in FIG. 4. In case the interfering radar unit transmit in a periodical fashion, the interfered data samples may form a regular pattern in the radar frame. Assuming that the radar frame 400 of FIG. 4 corresponds to time interval t12 of radar unit 102-1, the interfered data samples in the first half 408 of the frame are caused by the overlap with time interval t32 of radar unit 102-3 and the interfered data samples in the second half 410 of the frame are caused by the overlap with interval t22 of radar unit 102-2.

A method for interference reduction will now be described with reference to the flow chart of FIG. 5. The method may be performed by the controller 210 of a radar unit 102 in the system 100. The method may be performed independently in several radar units 102 of the system. For purposes of illustration, it is in the following assumed that the method is performed by the controller 210 of radar unit 102-1.

Figure 6:
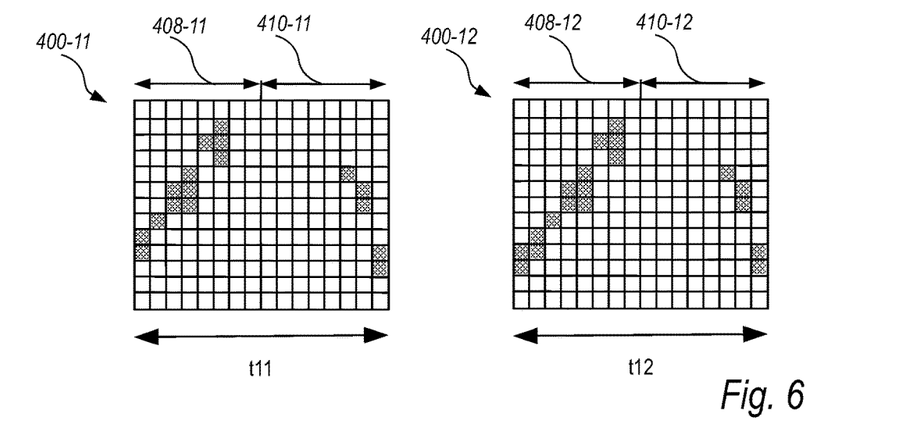
FIG. 6 illustrates two radar frames including interfered data samples as produced by a radar unit during two corresponding time intervals.

In step S502, the controller 210 receives one or more radar frames corresponding to one or more respective time intervals. The one or more radar frames may be subsequent radar frames produced by the radar unit 102-1. The one or more radar frames may be the most recent one or more radar frames produced by the radar unit 102-1 in relation to a point in time when all of the one or more frames have been received by the controller 210. Referring to FIGS. 3 and 6, the controller 210 of radar unit 102-1 may at time t1 have received a first radar frame 400-11 corresponding to the time interval t11 and a second radar frame 400-12 corresponding to the time interval t12. In this example, the one or more radar frames includes two radar frames. However, it is understood that the one or more radar frames may include a single radar frame, or more than two radar frames. In an example embodiment, 20-25 radar frames are received by the controller 210 in step S502. The controller 210 may receive the one or more frames at the same time. However, the controller 210 typically receives the one or more frames as soon as they have been produced by the radar unit 102-1. In that way, the controller 210 can start the processing of the radar frames as soon as they have been produced.

In step S504, the controller 210 of the radar unit 102-1 determines whether the received one or more radar frames 400-11, 400-12 have a higher presence of data samples that are subject to interference from other radar units 102-2, 102-3 in a first half of their corresponding time intervals t11, t12 than in a second, later, half of their corresponding time intervals t11, t12. This will be further explained with reference to the example of FIG. 6. The first radar frame 400-11 corresponds to the time interval t11. The data samples of the radar frame 400-11 may be divided into a first half 408-11 corresponding to a first half of the time interval t11, and a second half 410-11 corresponding to a second half of the time interval t11. The data samples in the first half 408-11 were hence produced by the radar unit 102-1 during the first half of the time interval t11, and the data samples in the second half 410-11 were hence produced by the radar unit 102-1 during the second, later, half of the time interval t11. In a similar manner, the data samples of the second radar frame 400-12 may be divided into a first half 408-12 and a second, later, half 410-12.

In order to carry out step S504, the controller 210 may, in a first group of embodiments, calculate a first quantity being indicative of the presence of interfered data samples in the first half of the time intervals of the received one or more radar frames, and a second quantity being indicative of the presence of interfered data samples in the second half of the time intervals of the received one or more radar frames. The controller 210 may then compare the first quantity to the second quantity to see which one is the larger.

According to one approach, the controller 210 may calculate the first quantity by counting the number of interfered data samples in the first half of each of the received radar frames. Similarly, the controller 210 may calculate the second quantity by counting the number of interfered data samples in the second half of each of the received radar frames. For this purpose, the controller 210 may first identify interfered data samples in the one or more radar frames. Interfered data samples may, for example, be identified following the approach described in EP3637127A1 which is incorporated herein by reference. Specifically, the approach described in connection to steps S04 and S06 of FIG. 4 of that document may be used. In essence, that approach relies on calculating, for each temporal position along the fast time axis, a mean value of the data samples being arranged at that fast time temporal position. Referring to FIG. 4, this hence involves calculating a mean value for each row of the radar frame 400. In the above referenced document, the signal formed by the mean values is referred to as a reference beat signal. The beat signals of the radar frame (the columns of the radar frame 400 of FIG. 4) are then each compared to the reference beat signal using one or more thresholds. Those data samples for which a deviation between the signals or a derivative of the deviation exceeds a threshold are identified as interfered samples. To facilitate the identification of interfered data samples, the beat signals may be filtered prior to performing the identification. Particularly, a high-pass filter may be applied to the beat signals. The high-pass filter is preferably designed such that its cut-off frequency is above a frequency band corresponding to frequency content originating from desired reflections off objects in front of the radar unit.

Having identified interfered data samples in the one or more frames, the controller 210 may proceed to count the interfered samples in each of the halves of the received radar frames. In the example of FIG. 6, there are 12 interfered samples in the first half 408-11 of the first radar frame 400-11 and 14 interfered samples in the first half 408-12 of the second radar frame 400-12. The controller 210 may therefore calculate the first quantity by summing the number of interfered samples in the first half of each frame, giving 12+14=26 in the above example. Alternatively, the controller 210 may calculate an average of the number of interfered samples in the first half of each frame, giving (12+14)/2=13 in the above example. In the example of FIG. 6 there are 5 interfered data samples in the second half 410-11, 410-12 of each of the radar frames 400-11, 400-12. The second quantity hence becomes equal to 5+5=10 if the sum approach is applied and (5+5)/2=5 if the averaging approach is applied.

In the above examples, the data samples were given the same weight, being equal to one, when counting the number of interfered samples. However, it is also possible to give different data samples different weight depending on their positions within the radar frame when counting the interfered data samples. In that way, the counting includes summing the weights of the interfered data samples. Specifically, data samples that are located closer to a center of the radar frame may be given a higher weight than data samples that are located further away from the center of the radar frame. Generally, the weights may decrease with increasing distance of the position of the data sample to the center of the radar frame. Here, the center of the radar frame may refer to the center of the radar frame along the slow time axis (i.e., the center point of the corresponding time interval tij), the center of the radar frame along the fast time axis, or both. The weights may, for example, be calculated using a window function as described above. The window function applied by the controller 210 may be the same as the one applied by the radar processing unit 212.

According to another approach, the controller 210 may instead calculate the first quantity as a total energy of the data samples in the first half of each received radar frame. For this purpose, the controller 210 may sum the energy of each data sample in the first half of each received radar frame. The energy of a data sample may be calculated as the squared absolute value of the data sample. Hence, the controller 210 may calculate the first quantity as the sum of squared absolute values of the data samples in the first half of each received frame. Alternatively, the controller 210 may divide the so calculated sum by the number of received frames to arrive at a first quantity which is an average total energy in the first half of the received frames. In an analogue manner, the controller 210 may calculate the second quantity as the total energy of the data samples in the second half of each received radar frame. Notably, in this case the energy of all data samples in the radar frames are included in the calculations, not only the energy of the interfered data samples. There is hence no need to first detect the interfered samples in the radar frames. Also with this approach the data samples may be given different weights depending on their positions within the radar frame when calculating the first and the second quantity. For example, instead of calculating a sum of squared absolute values of the data samples, a weighted sum of squared absolute values of the data samples may be calculated. What was said about the weights above apply also to this situation.

When any of these approaches are used, the controller 210 ends up with a first quantity calculated with respect to the first halves 408-11, 408-12 of the radar frames and a second quantity calculated with respect to the second halves 410-11, 410-12 of the radar frames. The controller 210 can then compare the first quantity to the second quantity. Specifically, if the controller 210 finds that the first quantity is larger than the second quantity it can determine that the presence of data samples that are subject to interference from other radar units is higher in the first half of the time intervals than in the second half of the time intervals, and vice versa.

In order to carry out step S504, the controller 210 may, in a second group of embodiments, calculate a distribution that reflects how the presence of data samples that are subject to interference from other radar units are distributed over the time intervals of the one or more radar frames.

The distribution may be a distribution of a number of data samples that are subject to interference from other radar units over the time intervals of the one or more radar frames.

In other words, the controller 210 may calculate how the positions of the interfered data samples are distributed over the time intervals (i.e., along the slow time axis) of the received radar frames. In order to calculate such a distribution, the controller 210 may first identify interfered data samples and their positions along the slow time axis of the received radar frames as described above. The controller 210 may then form a distribution, e.g. in the form of a histogram, of the positions of the interfered data samples along the slow time axis of the received radar frames. This is further illustrated in FIG. 7 which again shows the radar frames 400-11 and 400-12 received by the controller 210 of the radar unit 102-1 and a distribution 700 in the form of a histogram of the interfered samples along the slow time axis. Data samples which are identified as being subject to interference are illustrated with a dotted pattern. In this case there are two interfered samples in the first radar frame 400-11 and two interfered samples in the second radar frame 400-12 for the first temporal position along the slow time axis (corresponding to the first beat signal of the radar frames). Accordingly, the controller 210 records four interfered samples for the first temporal position along the slow time axis in the histogram 700. Similarly, there is one interfered sample in the first radar frame 400-11 and two interfered samples in the second radar frames 400-12 for the second temporal position along the slow time axis (corresponding to the second beat signal of the radar frames). Accordingly, the controller 210 records three interfered samples for the second temporal position along the slow time axis in the histogram 700. The controller 210 may repeat this procedure and accumulate the number of interfered samples from the received radar frames for each temporal position along the slow time axis of the radar frames to arrive at the histogram 700. In the above example the interfered data samples are given equal weight when producing the histogram. As an alternative, the controller 210 may give different weights to different data samples depending on their positions within the radar frame when counting the interfered data samples. In that way, when counting the number of interfered samples for each temporal position along the slow time axis when producing the histogram, the controller 210 would sum the weights of the interfered data samples for the temporal position. What was said about the weights above in connection to the first group of embodiments apply also to this situation.

The distribution may alternatively be a distribution of energies of the data samples over the intervals of the received radar frames. In other words, the controller 210 may calculate how the energies of the data samples are distributed along the slow time axis of the radar frames. For that purpose, the controller 210 may for each temporal position along the slow time axis (i.e., for each beat signal), calculate a sum of the energies of the data samples being located at that temporal position along the slow time axis. Thus, the controller 210 may calculate the energy of each beat signal. As described above, the energy of a data sample may be calculated as the square of the absolute value of the data sample. Notably, this is not limited to calculating the energies of the interfered data samples, but the energies of all data samples are included in the calculation. Using this approach, there is hence no need to identify interfered samples in the received radar frames.

The controller 210 may then form an empirical distribution of the energies along the slow time axis of the received radar frames. This is further illustrated in FIG. 8 which shows the radar frames 400-11 and 400-12 received by the controller 210 of the radar unit 102-1 and a distribution 800 of the energies of the data samples along the slow time axis. In this case, the controller 210 may calculate a first sum of the energies of the data samples having the first temporal position along the slow time axis (corresponding to the first beat signal) in the first radar frame 400-11, and a second sum of the energies of the data samples having the first temporal position along the slow time axis (corresponding to the first beat signal) in the second radar frame 400-12. The controller 210 may then calculate a value of the distribution 800 for the first temporal position along the slow time axis as a sum or an average of the first sum and the second sum. The controller 210 may repeat this procedure and accumulate the energies of the data samples for each temporal position along the slow time axis of the radar frames to arrive at the distribution 800. Also with this approach the data samples may be given different weights depending on their positions within the radar frame when summing their energies. For example, instead of calculating a regular sum of squared absolute values of the data samples, a weighted sum of squared absolute values of the data samples may be calculated. What was previously said about the weights apply also to this situation.

Regardless of which approach is used when calculating the distribution, the controller 210 may use the distribution 700, 800 in step S504 in order to determine whether presence of data samples that are subject to interference from other radar units is higher in the first half of the time intervals than in the second half of the time intervals of the received frames. In more detail, the controller 210 may calculate a center of gravity of the distribution 700, 800 and check whether it is located in the first half or the second half of the time intervals of the one or more radar frames. A center of gravity of the distribution is the same thing as an expected value of the distribution and the calculation thereof is as such known in the art. If it is located in the first half, then the presence of interfered data samples is determined to be higher in the first half than in the second half. Conversely, if the center of gravity is located in the second half, the presence of interfered data samples is determined to be higher in the second half than in the first half. Turning to the examples of FIGS. 7 and 8, the center of gravities 701, 801 of the distributions 700, 800 are each located in the first half 408 of the time intervals t11, t12 of the received radar frames. Therefore, the controller 210 would come to the conclusion that the presence of interfered samples is higher in the first half 408 than in the second half 410 in each of these cases.

Depending on the outcome of the determination in step S504, the controller 210 either proceeds to perform step S506*a* or step S506*b*. In more detail, if the controller 210 determines in step S504 that the presence of interfered samples is higher in the first half of the received radar frames, it proceeds to step S506*a* and otherwise to step S506*b*.

In step S506*a*, the controller 210 postpones the scheduled time interval of an upcoming radar frame to be produced by the radar unit 102-1. By an upcoming radar frame is generally meant a radar frame which is not yet produced by the radar unit 102-1. Particularly, it is ahead in time of the radar frames received in step S502, and it may be the immediately next frame to be produced by the radar unit 102-1 after the received frames. Referring to the example of FIG. 3, the controller 210 of radar unit 102-1 had at time point t1 received radar frames corresponding to time intervals t11 and t12. The radar unit 102-1 is further scheduled to produce a next radar frame during time interval t13 following the general rule that the start times of the time intervals are separated by a predetermined time period of T. The scheduled time interval t13 is illustrated with a dashed outline in FIG. 3. Since, the controller determined in step S504 that the presence of interfered samples was higher in the first half of the received radar frames, the controller 210, in step S506a, postpones the time interval t13 such that it starts at a later time point than scheduled. The postponed time interval is denoted t13' and is illustrated with a solid line in FIG. 3. As is understood from FIG. 3, the interference in the received radar frames t11 and t12 was mainly caused by the overlap with the active time intervals t31 and t32 of radar unit 102-3. The postponement of the scheduled time interval t13 serves to reduce this overlap for future frames.

If the controller 210 instead had determined in step S504 that the presence of interfered samples was higher in the second half of the time interval, it would in step S506b advance the time interval t13 to start at an earlier time point than scheduled.

Figure 7:
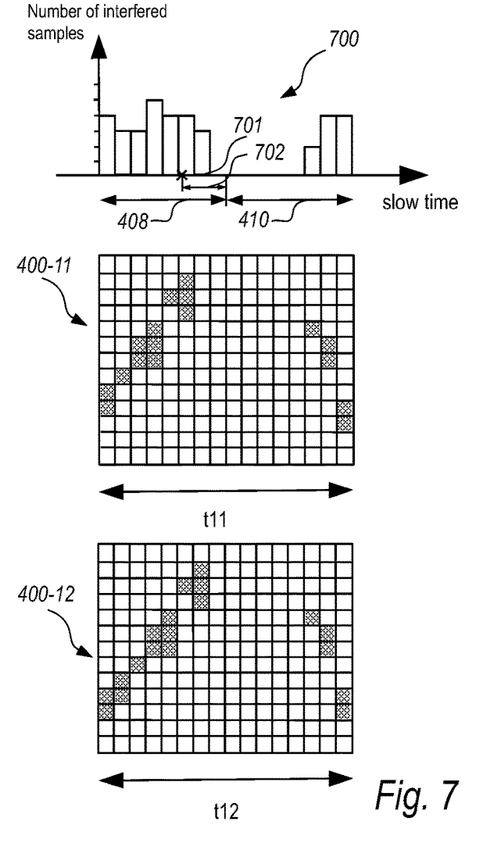
FIG. 7 schematically illustrates a distribution of the number of interfered data samples in the two radar frames shown in FIG. 6 over their time intervals.
Figure 8:
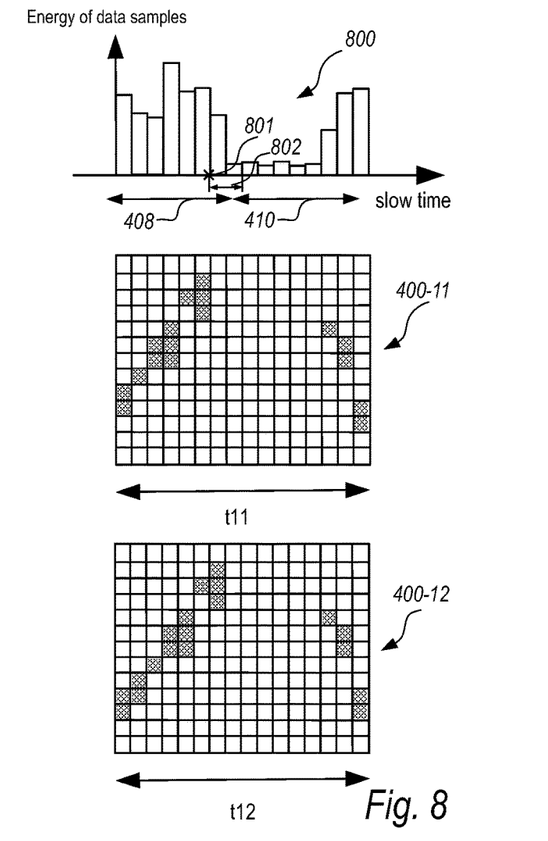
FIG. 8 schematically illustrates a distribution of energies of data samples over the time intervals of the two radar frames shown in FIG. 6.

The amount by which the controller 210 postpones or advances the time interval of an upcoming radar frame may be determined in different ways. For example, the amount may correspond to a predefined value, such as an eighth of the duration of a radar frame of the radar unit, or to a randomly selected amount. According to another example, the amount may be proportional to a difference between the first quantity and the second quantity calculated by the controller 210 in the first group of embodiments described above. Alternatively, the amount may be proportional to a ratio between the first and the second quantity. According to still another example, the amount may depend on a location of the center of gravity of the distribution within the time intervals of the one or more radar frames as calculated by the controller 210 in the second group of embodiments described above. Referring to FIGS. 7 and 8, the amount may depend on a distance 702, 802 between the center of gravity 701, 801 and a center point of the time intervals of the received radar frames 400-11, 400-12. The smaller the distance 702, 802, the larger the amount of adjustment. For example, the amount may be inversely proportional to the distance. In any of these examples, the constant of proportionality is a tuning parameter of the method that will depend on properties, such as frame rate and frame duration, of the radar unit. There may also be set a maximum value for how much an upcoming radar frame may be postponed or advanced. For example, the maximum value may correspond to a quarter of the duration of a radar frame of the radar unit, i.e., a quarter of the length of the time interval corresponding to the radar frame.

In the above, one iteration of the method performed by the controller of a radar unit was described. However, it is understood that the method may be repeated over time so as to adaptively adjust the time intervals when the radar unit is active in view of interference from other radar units. For example, the method may be repeated at a predetermined time interval, such as once per every 20 or 25 radar frames.

It is further understood that several of the radar units 102-1, 102-2, 102-3 in the radar system 100 may carry out the described method independently of each other. For example, the method may be carried out by all radar units 102-1, 102-2, 102-3 in the system 100, or by all but one or the radar units in the system, such as by radar units 102-1 and 102-2 in the example system of FIG. 1. In the latter case one of the radar units may act as a master unit (not performing the method and being active during regular time intervals) and the other radar units in the system may act as slave units (performing the method). The slave units will in such a setting adapt their active time intervals to the active time intervals of the master unit.

Figure 5:
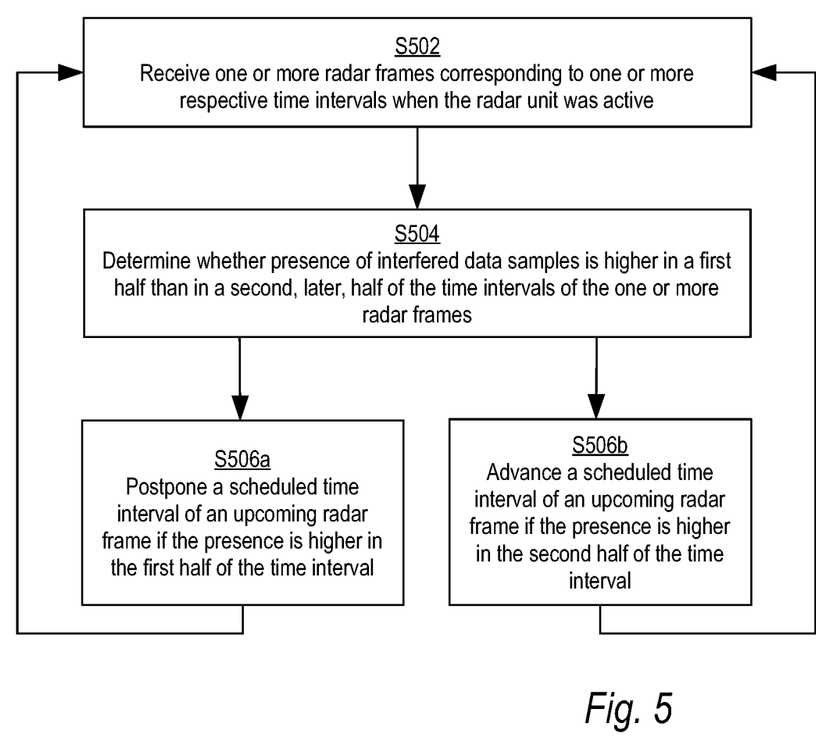
FIG. 5 is a flowchart of a method for interference reduction according to embodiments.

Returning to the example of FIG. 3, it is now assumed that all radar units 102-1, 102-2, 102-3 perform the method of FIG. 5 independently of each other. In that example, the controller 210 of the first radar unit 102-1 received radar frames corresponding to time intervals t11 and t12 and postponed the scheduled upcoming time interval t13 of the next radar frame of radar unit 102-1 to t13'. In a similar way, the controller 210 of radar unit 102-2 receives radar frames corresponding to time intervals t21 and t22. As can be seen in FIG. 3, there is a slight overlap between time intervals t21 and t22 with t11 and t12, respectively, that likely would end up as interfered data samples in the first half of the radar frames produced by radar unit 102-2. Therefore, also the controller 210 of the second radar unit 102-2 would likely decide to postpone its scheduled time interval t23 of the next radar frame to a later time interval t23'. Independently of the others, the controller 210 of the third radar unit 102-3 receives radar frames corresponding to time intervals t31 and t32. As can be seen if FIG. 3, there is an overlap between time intervals t31 and t32 with t11 and t12, respectively, that likely would end up as interfered data samples in the second half of the radar frames produced by the third radar unit 102-3. Therefore, the controller 210 of the third radar unit 102-3 would likely decide to advance its scheduled time interval t33 of the next radar frame to an earlier time interval t33'. As is clear from FIG. 3, a result of these adjustments by the radar units 102-1, 102-2, 102-3, is that the total amount of overlaps between the time intervals t13', t23', t33' of the upcoming radar frames are reduced, thus leading to an interference reduction for the system as a whole. The above example only illustrates one iteration of the method. In practice, the method may be repeated by the radar units over time to further adjust the active time intervals of the radar units 102-1, 102-2, 102-3. After a few iterations of the method one will arrive at a state where the intervals of the radar units are optimally distributed over time, i.e., with the least amount of total overlap between intervals of different radar units. Further, as there may be a drift in the clocks of the radar units, the time intervals may start drifting in relation to each other from that optimal distribution. However, since the method is repeated over time, the radar units 102 in the system may quickly adapt to and compensate for new interferences that are introduced due to the clock drift.

As described above, the controller 210 may be configured to implement an interference reduction method of a radar unit 102. For this purpose the controller 210 may include circuitry which is configured to implement the various method steps decribed above.

In a hardware implementation, the circuitry may be dedicated and specifically designed to implement one or more of the method steps. The circuitry may be in the form of one or more integrated circuits, such as one or more application specific integrated circuits or one or more field-programmable gate arrays. By way of example, the controller 210 may hence comprise circuitry which, when in use, determines whether the presence of interfered data samples is higher in a first half than in a second half of the received radar frames.

In a software implementation, the circuitry may instead be in the form of a processor, such as a microprocessor, which in association with computer code instructions stored on a (non-transitory) computer-readable medium, such as a non-volatile memory, causes the controller 210 to carry out any method disclosed herein. Examples of non-volatile memory include read-only memory, flash memory, ferroelectric RAM, magnetic computer storage devices, optical discs, and the like. In a software case, each of the method steps described above may thus correspond to a portion of computer code instructions stored on the computer-readable medium, that, when executed by the processor, causes the controller 210 to carry out the that method step.

It is to be understood that it is also possible to have a combination of a hardware and a software implementation, meaning that some method steps are implemented in hardware and others in software.

It will be appreciated that a person skilled in the art can modify the above-described embodiments in many ways and still use the advantages as shown in the embodiments above. For example, the controller does not need to be included in a radar unit. It could be provided separately from the radar units. For example, it could be provided centrally in the radar system. Thus, the claims should not be limited to the shown embodiments but should only be defined by the appended claims. Additionally, as the skilled person understands, the shown embodiments may be combined.

The invention claimed is:

1. A method for interference reduction performed by a radar unit, comprising:
   receiving one or more radar frames, wherein the one or more radar frames correspond to one or more respective time intervals during which the radar unit was activated to transmit and receive signals to produce data samples of the one or more radar frames,
   determining whether the one or more radar frames have a higher presence of data samples that are subject to interference from other radar units in a first half of their corresponding time intervals than in a second, later, half of their corresponding time intervals,
   in case it is determined that the presence is higher in the first half of their corresponding time intervals, postponing a scheduled time interval of an upcoming radar frame to be produced by the radar unit, and
   in case it is determined that the presence is higher in the second half of their corresponding time intervals, advancing a scheduled time interval of an upcoming radar frame to be produced by the radar unit.

2. The method of claim 1, wherein the step of determining includes:
   calculating a first quantity and a second quantity being indicative of the presence of data samples that are subject to interference from other radar units in the first half and in the second half, respectively, of the time intervals of the one or more radar frames, and
   determining that the presence of data samples that are subject to interference from other radar units is higher in the first half of the time intervals than in the second half of the time intervals if the first quantity is larger than the second quantity.

3. The method of claim 2, wherein the scheduled time interval of the upcoming radar frame is postponed or advanced by an amount which is proportional to a difference between the first quantity and the second quantity.

4. The method of claim 2, wherein the first quantity and the second quantity are calculated as a number of data samples that are subject to interference from other radar units in the first half and the second half, respectively, of the time intervals of the one or more radar frames.

5. The method of claim 2, wherein the first quantity and the second quantity are calculated as a sum of energies of data samples in the first half and in the second half, respectively, of the time intervals of the one or more radar frames.

6. The method of claim 2, wherein the data samples in the one or more radar frames are given different weights according to their temporal positions within the time intervals of the one or more radar frames when calculating the first and the second quantity, wherein the weights decrease with increasing distance of a temporal position of a data sample to a center point of a time interval.

7. The method of claim 1, wherein the step of determining includes:
   calculating a distribution that reflects how the presence of data samples that are subject to interference from other radar units are distributed over the time intervals of the one or more radar frames, and
   determining that the presence of data samples that are subject to interference from other radar units is higher in the first half of the time intervals than in the second half of the time intervals if a center of gravity of the distribution is located in the first half of the time intervals of the one or more radar frames.

8. The method of claim 7, wherein the scheduled time interval of the upcoming radar frame is postponed or advanced by an amount which depends on a location of said center of gravity of the distribution within the time intervals of the one or more radar frames, wherein said amount increases with decreasing distance between the location of the center of gravity and a center point of the time intervals of the one or more radar frames.

9. The method of claim 7, wherein the distribution is calculated as a distribution of a number of data samples that are subject to interference from other radar units over the time intervals of the one or more radar frames.

10. The method of claim 7, wherein the distribution is calculated as a distribution of energies of the data samples over the time intervals of the one or more radar frames.

11. The method of claim 1, wherein the method is repeated at a predetermined time interval.

12. The method of claim 1, wherein the radar unit is included in a system of a plurality of radar units, and the method is performed independently by at least two radar units among the plurality of radar units.

13. A controller for interference reduction in a radar unit, the controller comprising
   circuitry configured to receive one or more radar frames, wherein the one or more radar frames correspond to one or more respective time intervals during which the radar unit was activated to transmit and receive signals to produce data samples of the one or more radar frames,
   circuitry configured to determine whether the one or more radar frames have a higher presence of data samples that are subject to interference from other radar units in a first half of their corresponding time intervals than in a second, later, half of their corresponding time intervals,
   circuitry configured to postpone a scheduled time interval of an upcoming radar frame to be produced by the radar unit in case it is determined that the presence is higher in the first half of their corresponding time intervals, and
   circuitry configured to advance a scheduled time interval of an upcoming radar frame to be produced by the radar unit in case it is determined that the presence is higher in the second half of their corresponding time intervals, advancing a scheduled time interval of an upcoming radar frame to be produced by the radar unit.

14. A radar unit comprising a controller for interference reduction in a radar unit, the controller comprising:

circuitry configured to receive one or more radar frames, wherein the one or more radar frames correspond to one or more respective time intervals during which the radar unit was activated to transmit and receive signals to produce data samples of the one or more radar frames, circuitry configured to determine whether the one or more radar frames have a higher presence of data samples that are subject to interference from other radar units in a first half of their corresponding time intervals than in a second, later, half of their corresponding time intervals, circuitry configured to postpone a scheduled time interval of an upcoming radar frame to be produced by the radar unit in case it is determined that the presence is higher in the first half of their corresponding time intervals, and circuitry configured to advance a scheduled time interval of an upcoming radar frame to be produced by the radar unit in case it is determined that the presence is higher in the second half of their corresponding time intervals, advancing a scheduled time interval of an upcoming radar frame to be produced by the radar unit.

15. A non-transitory computer-readable medium having stored thereon computer code instructions adapted to carry out a method for interference reduction performed by a radar unit when executed by a device having processing capability, the method, comprising:

receiving one or more radar frames, wherein the one or more radar frames correspond to one or more respective time intervals during which the radar unit was activated to transmit and receive signals to produce data samples of the one or more radar frames, determining whether the one or more radar frames have a higher presence of data samples that are subject to interference from other radar units in a first half of their corresponding time intervals than in a second, later, half of their corresponding time intervals, in case it is determined that the presence is higher in the first half of their corresponding time intervals, postponing a scheduled time interval of an upcoming radar frame to be produced by the radar unit, and in case it is determined that the presence is higher in the second half of their corresponding time intervals, advancing a scheduled time interval of an upcoming radar frame to be produced by the radar unit.

* * * * *